US011259251B2

(12) United States Patent
Maggi et al.

(10) Patent No.: US 11,259,251 B2
(45) Date of Patent: Feb. 22, 2022

(54) UPLINK POWER ADJUSTMENT FOR PACKET DATA CONVERGENCE PROTOCOL (PDCP) DUPLICATION

(71) Applicant: NOKIA TECHNOLOGIES OY, Espoo (FI)

(72) Inventors: Lorenzo Maggi, Paris (FR); Stefano Paris, Vanves (FR); Teemu Veijalainen, Helsinki (FI); Qiyang Zhao, Antony (FR); Kalle Petteri Kela, Kaarina (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/879,143

(22) Filed: May 20, 2020

(65) Prior Publication Data
US 2021/0368450 A1    Nov. 25, 2021

(51) Int. Cl.
*H04W 52/14* (2009.01)
*H04W 52/24* (2009.01)
*H04W 52/26* (2009.01)

(52) U.S. Cl.
CPC ......... *H04W 52/146* (2013.01); *H04W 52/24* (2013.01); *H04W 52/262* (2013.01)

(58) Field of Classification Search
CPC ........... H04W 52/146; H04W 72/0413; H04W 88/08; H04W 72/0473; H04W 52/262; H04W 52/246
See application file for complete search history.

(56) References Cited

U.S. PATENT DOCUMENTS

| | | | |
|---|---|---|---|
| 9,357,510 B2 | 5/2016 | Damnjanovic et al. | |
| 9,900,844 B2 | 2/2018 | Papasakellariou et al. | |
| 10,085,265 B2 | 9/2018 | Vajapeyam et al. | |
| 2013/0128856 A1* | 5/2013 | Iwai ........................ | H04L 5/001 370/329 |
| 2016/0021618 A1 | 1/2016 | Yin et al. | |

OTHER PUBLICATIONS

3rd Generation Partnership Project, Technical Specification Group Radio Access Network, NR, "User Equipment (UE) radio transmission and reception," Part 1: Range 1 Standalone, 3GPP TS 38.101-1, V16.3.0, Mar. 2020.
ETSI TS 138 101-2, 5G, NR, "User Equipment (UE) radio transmission and reception," Part 2: Range 2 Standalone, 3GPP TS 38.101-2, V15.5.0, May 2019.
(Continued)

*Primary Examiner* — Keith Ferguson
(74) *Attorney, Agent, or Firm* — Squire Patton Boggs (US) LLP

(57) ABSTRACT

Systems, methods, apparatuses, and computer program products for real-time uplink (UL) power control are provided. One method may include estimating, by a network node, a power allocation function for determining power allocation across a plurality of legs that transmit simultaneously, the power allocation function being based on radio channel statistics and network performance metrics. The method may then include signaling, to a user equipment, the power allocation function and the parameters used to compute an output of the power allocation function.

26 Claims, 4 Drawing Sheets

(56) References Cited

OTHER PUBLICATIONS

3rd Generation Partnership Project, Technical Specification Group Radio Access Network, NR, "User Equipment (UE) radio transmission and reception," Part 3: Range 1 and Range 2 Interworking operation with other radios, 3GPP TS 38.101-3, V16.3.0, Mar. 2020.

3rd Generation Partnership Project, Technical Specification Group Radio Access Network, "Evolved Universal Terrestrial Radio Access (E-UTRA) and NR; Multi-connectivity," Stage 2, 3GPP TS 37.340, V16.1.0, Mar. 2020.

Wang H. et al., "Performance of Uplink Carrier Aggregation in LTE-Advanced Systems," IEEEVTS Vehicular Technology Conference. Proceedings, 2010.

Wang H. et al., "Radio resource management for uplink carrier aggregation in LTE-Advanced", EURASIP Journal on Wireless Communications and Networking, 2015.

He H. et al., "Power Scaling Method for Uplink Power Control with Carrier Aggregation", 2011 Third International Conference on Measuring Technology and Mechatronics Automation, pp. 883-886, Jan. 2011.

\* cited by examiner

UPLINK POWER ADJUSTMENT FOR PACKET DATA CONVERGENCE PROTOCOL (PDCP) DUPLICATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for packet data convergence protocol (PDCP) uplink (UL) power adjustment.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method that may include estimating, by a network node, a power allocation function for determining power allocation across a plurality of transmission legs, the power allocation function being based on radio channel statistics and network performance metrics. The method may also include signaling, to a user equipment, the power allocation function and the parameters used to compute an output of the power allocation function.

Another embodiment is directed to an apparatus, which may include at least one processor and at least one memory comprising computer program code. The at least one memory and computer program code configured, with the at least one processor, to cause the apparatus at least to estimate a power allocation function to determine power allocation across a plurality of transmission legs, the power allocation function being based on radio channel statistics and network performance metrics, and to signal, to a user equipment, the power allocation function and the parameters used to compute an output of the power allocation function.

Another embodiment is directed to an apparatus that may include means for estimating a power allocation function to determine power allocation across a plurality of transmission legs, the power allocation function being based on radio channel statistics and network performance metrics, and means for signaling, to a user equipment, the power allocation function and the parameters used to compute an output of the power allocation function.

Another embodiment is directed to a method that may include receiving, at a user equipment, a power allocation function for determining power allocation across a plurality of transmission legs and receiving input parameters used to compute an output of the power allocation function, the power allocation function being based on radio channel statistics and network performance metrics. The method may also include retrieving, for one or more of the legs, values for one or more of the input parameters, and computing, using the power allocation function and the values for the input parameters, a power allocation across the legs.

Another embodiment is directed to an apparatus, which may include at least one processor and at least one memory comprising computer program code. The at least one memory and computer program code configured, with the at least one processor, to cause the apparatus at least to receive a power allocation function for determining power allocation across a plurality of transmission legs and receiving input parameters used to compute an output of the power allocation function, the power allocation function being based on radio channel statistics and network performance metrics, to retrieve, for one or more of the legs, values for one or more of the input parameters, and to compute, using the power allocation function and the values for the input parameters, a power allocation across the legs.

Another embodiment is directed to an apparatus that may include means for receiving a power allocation function for determining power allocation across a plurality of transmission legs and receiving input parameters used to compute an output of the power allocation function, the power allocation function being based on radio channel statistics and network performance metrics, means for retrieving, for one or more of the legs, values for one or more of the input parameters, and means for computing, using the power allocation function and the values for the input parameters, a power allocation across the legs.

Another embodiment is directed to a non-transitory computer readable medium comprising program instructions stored thereon for performing any of the methods described herein.

BRIEF DESCRIPTION OF THE DRAWINGS

For proper understanding of example embodiments, reference should be made to the accompanying drawings, wherein.

DETAILED DESCRIPTION

Figure 1:
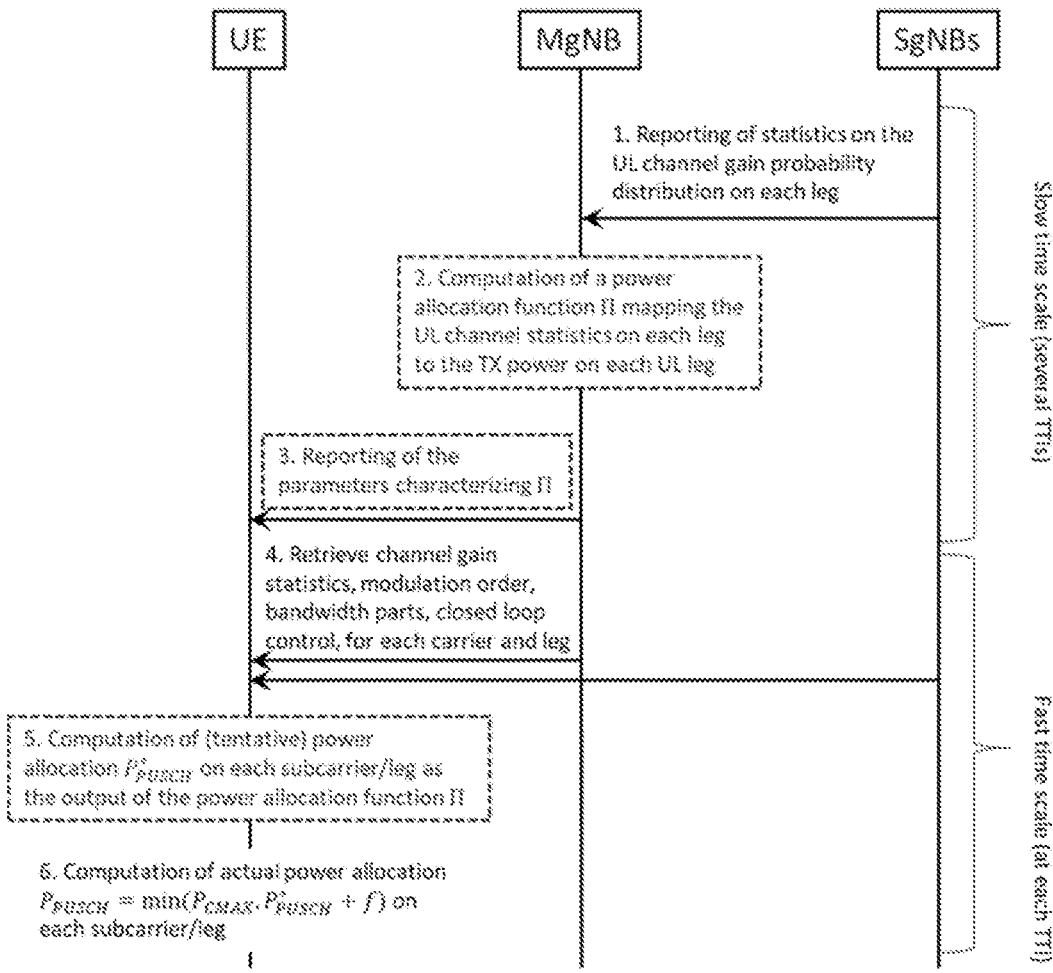
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for packet data convergence protocol (PDCP) uplink (UL) power adjustment, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification does not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments may generally relate to industrial IoT (IIoT). More specifically, some embodiments may relate to the application of PDCP duplication for NR and LTE, which targets the support of industrial automation applications where a packet loss can have serious consequences on the industrial system (e.g., as defined in 3GPP TS 38.323, 36.323). For instance, certain embodiments consider the application of power adjustment mechanisms to the PDCP protocol data units (PDUs), duplicated by the PDCP layer to further increase the packet reliability in multi-connectivity scenarios.

In current 3GPP cellular systems, the UE maximum output power is typically around 23 dBm. When a URLLC UE is utilizing PDCP duplication in the uplink (UL), which is an important feature to reach the desired reliability targets (i.e., 5-nine reliability), the total UE's transmission power budget is shared across its transmission legs that transmit simultaneously. A leg can be defined as a radio link control (RLC) entity associated to a PDCP protocol entity, in control of data duplication, and its corresponding radio link. Thus, legs can be different component carriers within the same gNB in case of carrier aggregation (CA)-based duplication or cells in distinct gNBs in dual-connection (DC)-based duplication.

When the radio access network (RAN) allocates radio resources for the UE, it takes the UL signal to interference and noise ratio (SINR) estimation and UL power headroom of the UE into account when assigning physical frequency and time domain resources. If the current UL transmission power is not enough to perform a transmission to operate according to the desired block error rate (BLER), the network may instruct the UE to increase its transmission power by sending a Transmit Power Command (TPC) using a "power-up" command. The UE sends the power headroom reports (PHR) to inform the gNB about the difference between the nominal UE maximum power and the estimated power used for uplink transmissions. If the maximum power is in use, then the power headroom will be obviously zero.

More specifically, according to 3GPP TS 38.213 v15, Chapter 7, the power $P_{PUSCH}$ for Physical Uplink Shared Channel (PUSCH) transmissions per BWP, carrier, serving cell, transmission occasion is computed by the UE as:

$$P_{PUSCH,b,f,c}(i, j, q_d, l) =$$
$$\min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{Bmatrix} [dBm](*)$$

where $P_{CMAX,f,c}(i)$ is the maximum transmit power (i.e. 23 dBm) for carrier f of serving cell c in PUSCH transmission occasion i, $P_{O\_PUSCH,b,f,c}(j)$ is the UE specific power parameter, indicated by p0-PUSCH-Alpha set (open-loop power control), $\alpha_{b,f,c}(j)$ is the cell specific path loss compensator, indicated by p0-PUSCH-Alpha set (open-loop power control), f is TPC command with absolute/relative value (closed-loop power control), M is the bandwidth of PUSCH resource assignment in PRBs, P is the downlink path loss estimate in dB calculated by UE reference signal, and Δ represents code blocks, modulation order, CSI/UL-SCH data.

To avoid unnecessary and error-prone downlink control channel (DCI) signalling to indicate a scheduling grant to the UE, it is expected that the so-called configured grant (CG) configuration-based scheduling will be used to serve deterministic uplink traffic such as periodical URLLC transmissions. In CG, the network provides pre-configured time-frequency resources having a periodical uplink allocation that recurs with a certain network-defined periodicity, according to the traffic needs. In this way, the scheduling delay can be minimized, and reliability increased because control channel bottlenecks and decoding errors are removed.

Using multiple legs allows improving target metrics that depend on the overall connectivity, and not only on each leg separately. These target metrics may include, for example, communication reliability, communication delay, overall transmission power, and physical resource utilization. At the same time, when multiple legs are simultaneously used by a UE, the limited UE transmit power budget is shared among its legs. Consequently, the decision on power allocation on each leg should be coordinated among the legs.

However, the current arrangement is that the UL power allocation (and, specifically, the open-loop power control parameters $P_{O\_PUSCH}$ and α) is decided independently for each leg, which entails that no coordination is enforced across legs. The lack of coordination across legs may result in, for instance, a decrease in the communication reliability, an increase in the packet delay, and/or a waste of transmitting power.

Since a packet is considered to be correctly received if it is received successfully on at least one leg, then in the low SINR regime, the power should be allocated on the strongest leg, and in the high SINR regime, the power should be split on both legs. This can be achieved via some coordination among different legs. Without any coordination among the different legs, a decrease in communication reliability may result.

When the emitted power hits the maximum level for an URLLC UE utilizing packet duplication, where duplicates are sent over a plurality of transmission legs (e.g., up to 4 in Rel-16), it is difficult to allocate enough radio resources to get a (larger) packet successfully through within a single transmission time interval (TTI) transmission in a mini-slot configuration (having 2-OFDM symbols). In such scenarios, the gNB must allocate fewer frequency domain resources (i.e., PRBs), resulting in the UE segmenting the data packet, where the segments are sent over multiple TTIs. Segmenting over multiple TTIs is undesirable for URLLC because it causes packet delays and increases the risks of radio failures.

Further, if no coordination is enforced, then the power budget is fully used (and usually split equally among legs), which may result in a waste of transmission power. However, by coordinating legs, power can be economized while still achieving the metric targets.

In order to address at least the problems outlined above, certain embodiments can provide a method to jointly optimize the UE power allocation across a plurality of legs for UEs using (PDCP) data duplication. For example, this may be useful for power-limited URLLC transmissions, but can also be applied to other types of transmissions.

Multi-Radio Dual Connectivity (MR-DC) is a generalization defined in 3GPP TS 37.340 of the Intra-E-UTRA Dual Connectivity (DC) described in 3GPP TS 36.300. In MR-DC a multiple receiver (Rx)/transmitter (Tx) capable UE may be configured to utilize resources provided by two different nodes connected via non-ideal backhaul, one providing NR access and the other one providing either E-UTRA or NR access. One node acts as the Master Node (also called MgNB) and the other as the Secondary Node (also called SgNB). The MgNB and SgNB are connected via a network interface and at least the MgNB is connected to the core network. On top of the MR-DC architecture, 3GPP has defined the support for data duplication at the PDCP layer in order to increase the redundancy of packet transmissions by using the resources provided by MR-DC (e.g., as described in 3GPP TS 38.323).

In 3GPP systems including 5G NR, the UE determines the uplink transmit power, e.g., of the Physical Uplink Shared Channel (PUSCH) channel Essentially, the UE applies an uplink power control scheme in an open loop fashion based on network-configured parameters (e.g., alpha, P0). In addition, the gNB can dynamically control the uplink transmit power level in a closed loop form by sending Transmit Power Control (TPC) commands via the TPC field in downlink control information (DCI) 0 or medium access control (MAC) control element (CE), as described in 3GPP TS 38.213. A maximum emitted power limit is defined per UE. As highlighted in 3GPP TS 38.101, UE maximum output power is measured over the component carriers from different bands. When each band has separate antenna connectors, maximum output power is measured as the sum of maximum output power at each UE antenna connector. The period of measurement is at least one sub frame (1 ms).

Therefore, even though a UE may run the power control algorithm independently for each leg and each leg might have a distinct transmit power, the available maximum uplink power budget, based on the UE power class category, is shared across the transmission legs that are transmitting simultaneously. Currently, it is largely up to the UE how to ensure the objective that the maximum power budget is not exceeded under these circumstances in single-RAT scenarios. To this end, power back-off schemes have been proposed to ensure the objective by reducing the transmit power over one or more legs.

In multi-RAT scenarios, the standard instead defines some procedures for the UE to reduce the transmit power over the secondary legs (i.e., cells belonging to the SCG) to ensure compliance with the UE power class (e.g., as provided in section 7 of TS 38.213).

According to certain example embodiments discussed herein, a network-assisted method is provided to ensure compliance with the maximum transmit power that allows to coordinate power allocation decision across legs. This allows for increasing reliability, decreasing latency and/or economizing the transmitting power.

Coverage enhancements or link budget enhancements have been studied and included in LTE for the NB-IoT solution. NB-IoT mainly uses repetition to enhance the UL link budget. The 2G solution via global system for mobile communication (GSM) allows up to 33 dBm transmit power, with effective isotropic radiated power (EIRP) due to the 1:8 duty cycle. The NB-IoT solution with repetition or enhanced coding requires significant delay in the transmission and is not suitable, e.g., for voice or URLLC services.

The GSM solution with high transmit power (33 dBm) and duty cycle transmission is not a preferable solution as the UE power amplifier (PA) is very expensive and power consuming. The standard PA in a 5G NR device is limited to up to 24 dBm and any output power beyond 24 dBm is not a feasible solution from a device implementation point of view.

Release-15 semi-persistent uplink radio resources on the PUSCH channel are referred to as Configured Grants (CG), which are also known as grant-free. CGs may be used in certain embodiments provided herein. CGs are introduced in NR for RRC Connected UEs according to two different types: Type-1 and Type-2. According to Type-1, the resource configuration and activation is provided via radio resource control (RRC). For Type-2, the resource configuration is provided via RRC whereas activation is provided via PDCCH (DCI format 0_1, i.e., PUSCH grant) addressed to the configured scheduling (CS)-radio network temporary identifier (RNTI).

PDCP Duplication in the uplink is controlled by the network using a duplication MAC CE that controls the duplication on/off and/or the selections of the legs to be used for transmitting the duplicates. This way, the network can control how many copies the UE will be transmitting, and which legs the UE will be using for the transmissions. However, if the legs belong to different nodes (e.g., in DC scenarios), the UL power control of the legs is run independently by the two nodes accounting for the power headroom report. In Multi-RAT DC for NR, dynamic power sharing capability has been introduced in 3GPP TS 38.331.

As will be discussed in more detail in the following, certain embodiments target the maximization of the communication reliability considering its distribution across the legs. This makes the UL power split, which is decided either at the UE or by the network, robust against the variation of the channel gain and block error rate (BLER), which are unknown (yet predictable) when the decision is taken.

Thus, in certain embodiments, in addition to defining maximum power budgets for plurality of transmission legs, actual UL Tx power calculation can be optimized to account multiple transmission legs. Moreover, some embodiments provide network controlled precalculated UL power function options that are expected to improve adaptation to different target metrics such as reliability maximization, delay minimization and UE energy consumption minimization.

An embodiment provides a method for real-time coordinated UL power control in dual connectivity. In certain embodiments, this real-time coordinated UL power control may be achieved by a MgNB estimating a power allocation function based on radio channel statistics and network performance metrics. For instance, the function could take Reference Signal Received Power (RSRP) and modulation and coding scheme (MCS) of the legs as input, and output could be power split percentage among the legs maximizing some performance objective such as joint-error probability of the legs. This function may be represented by, for example, a set of polynomial coefficients, a set of tabular entries, the parameters of a neural network, etc.

In an embodiment, the power allocation function may be signalled to a UE, with the real-time input measurements needed to compute the output of the function. The function may be updated from time to time, e.g., if the MgNB computes a better estimate of the function or if the environment changes resulting in new optimal power allocation function.

As such, according to example embodiments, a MgNB has the ability to communicate a pre-computed power allocation function to a UE, allowing coordinated real-time power control decisions at the UE across different legs, based on higher knowledge obtained by the network that is not available at the UE.

Certain embodiments also provide a number of mechanisms for constructing the UL power control function and deciding the power split across the available legs used for data transmission in a 5G system, with the aim of increasing the reliability and/or the throughput, and/or decreasing the PRB utilization rate and/or the transmission power. Some embodiments may be used in combination with a data duplication scheme, such as PDCP-layer duplication or higher layer duplication (i.e., above PDCP).

With respect to the baseline solution where power is decided independently for each leg, certain embodiments allow for joint power allocation across different legs. Moreover, the decision on power split can be modified and recomputed at high frequency (e.g., at each TTI). In fact, the power allocation decision may be taken by a single entity, i.e., a UE, having the needed information (e.g., information on channel quality) readily available, and are easily computed as the output of a pre-computed function.

Example embodiments are beneficial as the ability of the UE to use the pre-computed power allocation function across different legs allows the UE to increase the transmission reliability when using multiple legs with different channel qualities, to increase the achieved throughput, to decrease the PRB utilization rate, and/or to economize the overall UL transmission power.

As one example, a UE may be considered to be attached to several legs that may be denoted as L. At each TTI, in the UL, the UE decides the power allocation to be adopted over the next TTI on each leg and on each associated subcarrier.

FIG. 1 illustrates an example signaling diagram according to one embodiment. As illustrated in the example of FIG. 1, for every T>>1 TTIs and for a specific UE, the MgNB may, at 1, collect from SgNBs some statistics on the UL channel gain probability distribution on each leg (e.g., the first n moments of the distribution) through the Xn interface. At 2, the MgNB may compute a parametrized power allocation function Π that receives a set of input parameters, tunable or measurable by the UE itself, and may output the optimal Tx power on each associated subcarrier, for each UL leg. The input parameters may include a subset of the following parameters: i) UL instantaneous channel measurement on each subcarrier for each leg, ii) modulation scheme used on each subcarrier/leg, iii) overall reliability target, iv) UE's preference on delay versus reliability, and/or v) UL power budget. Then, at 3, the MgNB may transmit, to the UE, the parameters of the power allocation function Π via an extended user command indicator (UCI).

As further illustrated in the example of FIG. 1, at 4, at each TTI i, the UE may retrieve channel gain statistics, such as the bandwidth parts, modulation order, average path loss and/or closed-loop power control parameter, for each leg. For example, the UE may retrieve the bandwidth of PUSCH resource assignment in PRBs for each leg. More specifically, the bandwidth of the PUSCH resource assignment expressed in number of resource blocks for PUSCH transmission occasion i on active UL bandwidth part b of carrier f of serving cell c and μ, for each b, f, c. In an embodiment, the UE may retrieve the modulation order for each carrier f and bandwidth part b and for each serving cell c (i.e., leg), called $MCS_{f,b,c}$. In an embodiment, the UE may retrieve the average path loss $PL_{b,f,c}$ for each bandwidth part b, carrier f and serving cell c (i.e., leg) and/or the closed-loop power control parameter $f_{b,f,c}(i)$. Optionally, in some embodiments, the UE may retrieve higher moments of the path loss $PL_{b,f,c}$, e.g., its variance $stdPL_{b,f,c}$.

As also illustrated in FIG. 1, at 5, The UE may perform a computation of power allocation $P^*_{PUSCH}$ on each subcarrier/leg as the output of the power allocation function. For example, the UE may compute the power allocation, $P_{b,f,c}^*(i)$, via the power allocation function Π as follows: $P_{b,f,c}^*(i) = \Pi([M_{RB,b,f,c}^{PUSCH}(i)]_{b,f,c}, [MCS_{f,b,c}]_{b,f,c}, [PL_{b,f,c}]_{b,f,c}, [stdPL_{b,f,c}]_{b,f,c})$. In an embodiment, at 6, the UE may compute the actual power allocation, $$P_{b,f,c}(i), \text{ as } P_{b,f,c}(i) = \min\left\{ \begin{array}{c} P_{CMAX,f,c}(i) \\ P_{b,f,c}^*(i) + f_{b,f,c}(i) \end{array} \right\},$$

where $P_{CMAX,f,c}(i)$ is the UE configured maximum output power (e.g., as defined in section 8-1 of TS 38.101-1, section 8-2 of TS38.101-2, and section 8-3 of TS38.101-3) for carrier f of serving cell c.

In some embodiments, it is noted that in procedures 1 to 3 of FIG. 1, the MgNB can decide and indicate the frequency of collection for the UL channel gain and/or transmitting the power allocation function Π to the UE, whenever a significant change in the channel gain statistics or in the network conditions has occurred. More broadly, in certain embodiments, a network entity, such as the MgNB, can also indicate to the UE when to collect channel gain statistics or modify any parameter of the collection procedure, such as frequency.

In the standard approach for allocating UL power (e.g., as described in TS 38.213 v15, chapter 7), the parameters $P_{O\_PUSCH}$ and α are determined independently for each leg. However, according to certain embodiments described herein, the two parameters are replaced and instead the UE is allowed to compute a (tentative) power allocation $P_{PUSCH}^*(i, l, sc)$ jointly for each leg and subcarrier, which is computed by the UE through the power allocation function Π communicated by the MgNB.

Example embodiments provide several target metric options for power coordination across legs. As discussed above, a MgNB may compute the power allocation function Π that outputs the power on each leg, with a goal of increasing the overall transmission reliability, increasing the achieved throughput, and/or economizing the overall UL transmission power.

Thus, one option is to provide reliability maximization. For purposes of illustration, it may be assumed that only one subcarrier is used on each leg for each TTI. Supposing that power $P_l$ is used on leg l. Therefore, the SNR on leg l can be defined as:

$$SNR_l = \frac{P_l G_l}{N_0},$$

where $G_l$ is the channel gain subject to fading and $N_0$ is the noise power. The reliability probability $p_r$ for UE u is defined as the probability that a packet is correctly received by UE u on at least one leg. Assuming independence of channel gains across legs, it equals one minus the probability of reception failure on the legs, for example, as follows:

$$p_r = 1 - \Pi_{l \in L} BLER_l(SNR_l),$$

where $BLER_l(SNR_l)$ is the block error rate over leg l, as a function of the SNR and associated with the MCS used on leg l.

In an embodiment, a communication is considered reliable if the reliability probability is higher than a certain threshold γ, i.e., if $p_r \geq \gamma$, given a certain SNR on each leg. It is noted that the channel conditions on each leg over the next TTI are unknown and can only be estimated by the MgNB. For this reason, it is desirable to allocate power across different legs to minimize the risk of the communication being unreliable. Therefore, in this scenario an important measure is the probability of communication being reliable, computed over the possible channel gain scenarios, which can be formally defined as:

$$Pr(p_r \geq \gamma) = \int Pr(p_r \geq \gamma | \{G_l\}_l = x) \cdot pdf(\{G_l\}_l = x) dx.$$

Since $Pr(p_r \geq \gamma)$ depends on the leg power allocation through the reliability probability $p_r$, it can be maximized as:

$$\Gamma(P^*) := \max_{P_l, m_l \forall l} Pr(p_r \geq \gamma) \quad (1)$$

$$s.t. \sum_l P_l = P.$$

In an embodiment, to compute the above objective function (1) and hence solve the reliability optimization problem, the MgNB may retrieve the UL channel gain probability distribution $pdf(\{G_l\}_l = x)$ for each leg l. Since estimating the entire distribution is difficult as it requires too many samples, the gNB may settle for describing the distribution via the first n moments of the channel distribution. The MgNB may also retrieve a function BLER (SNR) that outputs an expected value of BLER given the SNR on a PRB, allowing to compute the reliability as $p_r = 1 - \Pi_{l \in L} BLER_l(SNR_l)$. In one example, this can be pre-computed and stored in tabular form in each gNB.

Another option may provide delay minimization. The achieved delay for each PDCP packet is the minimum delay among the PDCP packets received correctly. Given a certain modulation scheme and power used on each leg, the legs may be sorted in increasing order of throughput: $thr(1) \geq thr(2) \geq \ldots$, where $thr(l)$ is the throughput on leg l associated to the modulation scheme $m_l$. Then, the average packet delay is 1/thr(1) if leg 1 is correctly received, otherwise it equals 1/thr(2) if leg 2 is correctly received, and so on, which is provided by the following:

$D := E[\text{packet delay}] = \Sigma_l 1/thr(l)(1-BLER_l(l))$
$\Pi_{k<l} BLER_k(k) + M\Pi_l BLER_l(k)$ where $M$ is interpreted as the penalty for not receiving the packet at all.

The average packet delay can be minimized with respect to the power $P_l$ used on each leg, which may be written as:

$$\max_{P_l, m_l \forall l} D \quad (2)$$

$$s.t. \sum_l P_l = P.$$

In an embodiment, to compute the above objective function (2) and hence solve the delay optimization problem, the MgNB may retrieve a function BLER (SNR) that outputs an expected value of BLER given the SNR on a PRB, as discussed above.

Another option may provide a reliability/delay trade-off. In this case, it may be desirable to reach a trade-off between (high) reliability and (low) delay. Then, the optimal power allocation at each TTI can be found by solving the following optimization problem:

$$\max_{P_l, m_l \forall l} Pr(p_r \geq \gamma) - \beta D \quad (3)$$

$$s.t. \sum_l P_l = P.$$

where $\beta > 0$ is a parameter that helps trading reliability with delay, that can be tuned by the UE as well as by the MgNB.

In an embodiment, to compute the above objective function (3) and hence solve the reliability/delay trade-off optimization problem, the MgNB may retrieve the UL channel gain probability distribution for each leg and/or a function that outputs an expected value of BLER given the SNR on a PRB, as for equation (1) discussed above.

Another option may provide power minimization. In this case, the goal is economizing the transmission power by ensuring that a target reliability and/or that a target delay is attained. More formally, the optimal power allocations on each leg solve the following problem:

$$\max_{P_l, m_l \forall l} \sum_l P_l \quad (4)$$

$$s.t. \ Pr(p_r \geq \gamma) \geq a$$

$$D \leq b$$

where a is the minimum tolerable probability of communication being reliable and b is the maximum tolerable average packet delay.

In an embodiment, to compute the above objective function (4) and hence solve the power minimization optimization problem, the MgNB may retrieve the UL channel gain probability distribution for each leg and/or a function that outputs an expected value of BLER given the SNR on a PRB, as for equation (1) discussed above.

With regard to the reliability maximization option, in order to solve numerically equation (1) discussed above, an important step is the computation of $Pr(p_r<\gamma)$, which in turns requires the solving of an integral. To facilitate this task, two reasonable assumptions may be made. A first assumption relates to Rayleigh fading and a second assumption relates to BLER shape, as discussed in the following.

With respect to the Rayleigh fading, it may be assumed that the channel gains are independent across legs, i.e., $pdf(\{G_l\}_l=x)=pdf(G_1=x_1)\cdot pdf(G_2=x_2)$ and each one follow a Rayleigh fading distribution, i.e., $pdf(G_l=x_l)=\lambda_l \exp(-\lambda_l x_l)$ for $l=1,2$.

With respect to BLER shape, it may be considered that the BLER behaves as the following function of SNR on leg l:

$$BLER_l(SNR_l) = \begin{cases} 1, & \text{if } SNR_l \le T_l \\ \exp(-c_l(SNR_l - T_l)), & \text{if } SNR_l > T_l \end{cases}$$

where the decay term $c_l$ and the threshold $T_l$ both depend on the modulation scheme used on leg l. The $BLER_l(\bullet)$ function depends on the modulation scheme $m_l$ to be used on leg l over the next TTI.

To compute the minimum-risk power allocation, under the two assumptions noted above, an analytical expression may be given for the risk of the communication being unreliable, i.e., $Pr(p_r<\gamma)$. For purposes of simplicity, an example using two legs may be used. Without loss of generality, it is assumed that the noise variance is unitary, i.e., $N_0=1$. It can then be observed that under the BLER assumption it is possible to show that the communication is reliable ($p_r>\gamma$) whenever:

$$\sum_{l:SNR_l>T_l} c_l(SNR_l - T_l) \ge -\log(1-\gamma).$$

For purposes of simplicity, it may be denoted that $\delta:=-\log(1-\gamma)$. Then, the complementary cumulative distribution $F_\Sigma(\delta)=Pr(\xi_\Sigma>\delta)$ of the random variable $\xi_\Sigma=\Sigma_{l\in L} c_l(P_l G_l - T_l) 1_{(P_l G_l > T_l)}$ may be computed. An embodiment may derive the pdf of the random variable $\xi_l = c_l(P_l G_l - T_l) 1_{(P_l G_l > T_l)}$, being a scaled exponential distribution plus a Dirac's delta centred in $x=0$:

$$f_{\xi_l}(x)=[1-A_l]\delta(x)+A_l\beta_l \exp(-\beta_l x),$$

where $\delta(x)$ is Dirac's delta function, $$\beta_l = \frac{\lambda_l}{P_l c_l} \text{ and } A_l = \exp\left(-\frac{\lambda_l T_l}{P_l}\right)$$

for each leg $l=1,2$. Then, the pdf of $\xi_\Sigma$ writes for $\beta_1 \ne \beta_2$:

$$f_{\xi_\Sigma}(x) = \left[(1-A_2)A_1 + \frac{A_1 A_2 \beta_2}{\beta_2 - \beta_1}\right]$$

$$\beta_1 \exp(-\beta_1 x) + \left[(1-A_1)A_2 + \frac{A_1 A_2 \beta_1}{\beta_1 - \beta_2}\right]\beta_2 \exp(-\beta_2 x)$$

while for $\beta_1=\beta_2:=\beta$:

$$f_{\xi_\Sigma}(x)=(A_1+A_2-2A_1A_2)\beta \exp(-\beta x)+A_1 A_2 \beta^2 x \exp(-\beta x),$$

when $\beta_2 \ne \beta_1$ its complementary cumulative function writes:

$$F_\Sigma(\delta) = Pr(\xi_\Sigma > \delta) = \left[(1-A_2)A_1 + \frac{A_1 A_2 \beta_2}{\beta_2 - \beta_1}\right]$$

$$\exp(-\beta_1 \delta) + \left[(1-A_1)A_2 + \frac{A_1 A_2 \beta_1}{\beta_1 - \beta_2}\right]\exp(-\beta_2 \delta)$$

if $\beta_1=\beta_2:=\beta$ then:

$$F_\Sigma(\delta)=(A_1+A_2-2A_1A_2)\exp(-\beta\delta)+A_1A_2(\beta\delta+1)\exp(-\beta\delta).$$

It is noted that $F_\Sigma(\delta)$ is effectively a function of a single variable. In fact, once the power allocated to leg 1 is set as $P:=P_1$, then the power on leg 2 is simply the remaining available budget $P_2=\overline{P}-P$.

Therefore, in order to solve equation (1), an embodiment can maximize $F_\Sigma(\delta)$ with respect to the single variable P. The optimal power allocation may be provided as $P^*=(P_1^*, P_2^*)$ and $\Gamma(P^*)$ is denoted as the risk probability $Pr(p_r \ge \gamma)$ when the optimal power P is used.

In some embodiments, numerical simulation results obtained by solving equation (1) using the analysis outlined above demonstrate that in the low SINR regime, the power should be allocated on the strongest leg and that, in the high SINR regime, the power should be split on both legs. Example embodiments therefore achieve consistent gains with respect to the situation in which there is no power coordination and/or power is split equally between the two legs when the channel quality is poor. Indeed, certain embodiments can increase reliability by investing more power on the strongest leg when both legs show poor channel conditions. This is achievable when coordination is enforced across legs, as provide by example embodiments provided herein.

In an embodiment, the power allocation function Π may be pre-computed by the MgNB, may be communicated to the UE, and may then be used at run-time by the UE itself. According to certain embodiments, the power allocation function Π can take on several possible forms. For instance, the power allocation function may be in the form of a table, a neural network, and/or polynomial.

In one embodiment, the power allocation function can take tabular form where the function Π can be described via a table. For example, the table may provide the optimal power split on each leg for a finite set of discretized inputs. Therefore, to communicate the function Π, the MgNB sends to the UE the list of possible tabular inputs and the corresponding outputs. At run-time, the UE may evaluate the metrics of interest (e.g., the channel gain), round them up to the nearest available input, and read the corresponding output in the table. Such a tabular approach has an advantage in that it is simple to implement in both gNBs and UEs.

In a further embodiment, the power allocation function can take the form of a neural network. In this case, the function Π may be approximated via a Neural Network (NN) with a possibly pre-defined layer structure. The computation of the parameters of the NN that allow the UE to compute the optimal power split can be performed as a classic supervised learning training task, for example as described in the following.

According to one example, the inputs to the NN may include those for the options discussed above, i.e., the reliability maximization option, the delay minimization option, the reliability/delay trade-off option, and/or the power minimization option. Specifically, the UL channel distribution may be collected from the UE, and the other parameters (i.e., reliability threshold, UL power budget)

may be uniform distributed values generated within a valid range. In terminology of NNs, the "labelled examples" are represented by the associated optimal power split on each leg, computed from the optimization models above. Then, the NN parameters can be computed via, e.g., classic backpropagation techniques, to approximate the model.

Once the NN parameters have been computed, the MgNB may transmit them to the UE (and, additionally, the structure of the NN is not pre-defined). It is noted that, at run-time, the UE may feed the NN with the evaluated metrics and no rounding is needed, which is different from the tabular approach discussed above.

An advantage of the NN approach is that it can provide the values of power under inputs that have not been observed by the gNB before, provided that the actual input falls within the observed input range. This is because NN is a solution function that can infer the unobserved values. This reduces overhead of transmitting a large set of sampled data.

According to a further embodiment, the power allocation function can take polynomial form. In this embodiment, the function $\Pi$ can be approximated as a weighted sum of pre-defined polynomial basis, such as Chebyshev polynomials. Analogously to the NN case, the MgNB may compute offline the optimal coefficients that are then communicated to the UE. At run time, the UE may evaluate the metrics of interest, may feed them to the estimated function $\Pi$, and may compute the optimal power split.

As one example, if $\Pi$ is a polynomial function, then the MgNB communicates the multiplicative coefficients associated to each component. For instance, if $\Pi(x, y, z)=-2x+3yz^2+7x^3+10$ (where x, y, z stand for the input parameters) then one possibility is that the MgNB communicates to the UE the tuples:

$\{(1,0,0), -2\}$, meaning: the coefficient associated to $x^1y^0z^0:=x$ is $-2$
$\{(0,1,2), 3\}$
$\{\{3,0,0\}, 7\}$
$\{(0,0,0), 10\}$ In some embodiments, several ways may be provided to encode the coefficients. For example, if classic regression (minimization of mean squared error) is used to approximate $\Pi$, then all coefficients are (most probably) non-zero, up to the maximum degree. Thus, in this case, it may be reasonable to encode coefficients as follows: $(d, a_1, a_2, \ldots, a_{A(d)})$, where d is the maximum degree (e.g., d=2), the exponents associated to the i-th coefficient $a_i$ are pre-agreed upon, and do not need to be communicated at run-time. For instance, as one example, for d=2, a natural correspondence could be $(0,0) \to a_1, (1,0) \to a_2, (0,1) \to a_3, (1,1) \to a_4, (2,0) \to a_5, (0,2) \to a_6$.

As an additional or alternative way for encoding the coefficients, it may be observed that communicating the value of d is redundant, since there is a one-to-one correspondence between the degree d and the number of regression coefficients A(d), hence only communicating $(a_1, a_2, \ldots, a_{A(d)})$ is sufficient.

Another way for encoding the coefficients may include, in order to use higher order regressions without having to communicate all coefficients (but only the important ones), using the classic Lasso regression that "encourages" the least important coefficients to nullify. In this case, the coefficients would be sparse, so that both the coefficient degree tuples and the coefficient value are communicated. In the example case of degree d=2, this amounts to communicating the non-zero coefficients among $\{(0,0), a_1\}, ((1,0), a_2\}, ((0,1), a_3\}, ((1,1), a_4\}, ((2,0), a_5\}, ((0,2), a_6\}$.

In certain embodiments, the power allocation function $\Pi$ can be approximated via a polynomial of degree d, that may be called $\Pi^{poly}$, where d is a pre-defined integer parameter. For instance, if d=2 and $\Pi^{poly}$ accepts two input variables (x, y), then $\Pi^{poly}(x, y)=a_1+a_2x+a_3y+a_4xy+a_5x^2+a_6y^2$.

According to an embodiment, the polynomial coefficients may be computed by standard polynomial regression, which minimizes the squared difference between the original function $\Pi$ and the approximated polynomial $\Pi^{poly}$ is minimized. For instance, for d=2, the coefficients $\alpha$ may be computed by solving:

$$a_1, \ldots, a_6 = \min_{a'} \sum_{x,y} (a'_1 + a'_2 x + a'_3 y + a'_4 xy + a'_5 x^2 + a'_6 y^2 -$$

$\Pi(x, y))^2$ which is calculated via standard linear regression with 1, x, y, xy, $x^2$, $y^2$ as regressors.

According to some embodiments, in order to be communicated to the UE, the coefficients a may be quantized. A polynomial power allocation function $\Pi^{poly}(\lambda_1^{-1}, \lambda_2^{-1})$ may be utilized which, for each MCS pair on each leg, maps the channel gain values $(\lambda_1^{-1}, \lambda_2^{-1})$ to an approximately optimal power allocation on both legs.

In certain embodiments, the approach may be extended to account for more input regression variables, as the MCS and the available bandwidth for each leg. According to one embodiment, the overall number of bits can be added as a constraint to the regression problem according to the maximum system overhead. Other optimizations based on lossless and lossy coding techniques can be used to reduce the overhead. For example, MCSs that result in similar power splits can be merged in a unique representation.

Regarding the frequency of transmission from a MgNB to a UE, the MgNB may transmit to a UE a function $\Pi^{poly}$ that also incorporates MCS among the inputs. This allows the MgNB to avoid updating and re-communicating $\Pi^{poly}$ to the UE each time the MCS is modified at any of the legs. It is expected that $\Pi^{poly}$ would change (and be retransmitted) very seldom, and at a frequency comparable to that of $P_0$ and $\alpha$ in the current standard.

Certain embodiments can further reduce the amount of overhead per transmission. For example, since similar MCS's correspond to very close power allocation values, it may be reasonable to cluster different values of MCS's and to assign the same power allocation output to same cluster. Therefore, if we cluster the 28 MCS's into C<28 MCS clusters, then $C^2$ 50 bits would be transmitted (e.g., if C=5 then 156 KB can be sent, once for all). In one embodiment, an appropriately encoded version of the value of the MCS may be encoded among the regressors in the polynomial approximation. In this case, more than 50 bits will be required, since the function to be approximated is more complicated, but surely less than $(\#MCS)^{\#legs} \times 50$, since the number of bits highly depends on the chosen degree d. Another embodiment may include a combination of the above where the clusters of MCS are considered as regressors.

In some example embodiments, the maximum number of bits J (e.g., J=500) allowed for communicating the power allocation function $\Pi$ may be treated as a constraint. Then, a goal could be to find the best coefficient encoding that allows to optimize performances by using at most J bits.

Figure 2A:
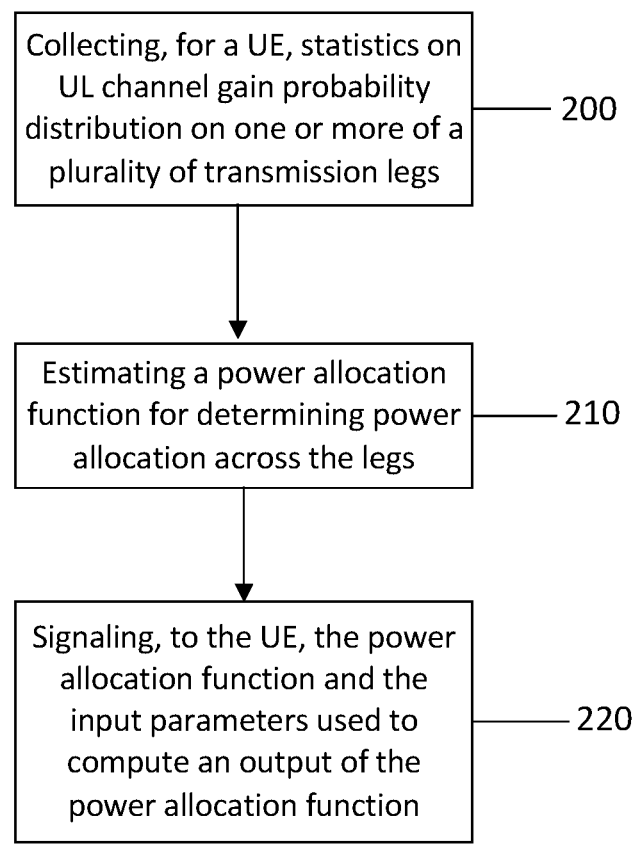
FIG. 2*a* illustrates an example flow diagram of a method, according to an embodiment.

FIG. 2a illustrates an example flow diagram of a method for real-time coordinated UL power control, e.g., in dual connectivity, according to one example embodiment. In certain example embodiments, the flow diagram of FIG. 2a may be performed by a network entity or network node in a communication system, such as LTE or 5G NR. For instance, in some example embodiments, the network node performing the method of FIG. 2a may include a base station, access node, eNB, gNB, and/or NG-RAN node, or the like. In one example embodiment, the network node may be a master node, such as a MgNB. For example, in an embodiment, the method of FIG. 2a may be performed by the MgNB illustrated in FIG. 1 and may include one or more of the procedures performed by the MgNB, as discussed in detail above.

As illustrated in the example of FIG. 2a, the method may include, at 200, collecting, for a UE, statistics on UL channel gain probability distribution on one or more of a plurality of transmission legs that are capable of transmitting simultaneously. For example, the collecting 200 may include collecting the statistics from a secondary network node over a Xn interface. In an embodiment, the method may then include, at 210, estimating a power allocation function for determining power allocation across the transmission legs. The power allocation function may be based on radio channel statistics and network performance metrics. According to certain embodiments, the estimating 210 may include computing a parametrized power allocation function configured to receive a set of input parameters tunable or measurable by the UE and to output a desired transmission power on the associated subcarrier for each of the legs. It should be noted that in certain embodiments, as used herein, the term "transmitting simultaneously" or "simultaneous transmission" may refer to the case where the same duplicated information is transmitted by a UE on multiple active legs over a certain time window. In other words, "simultaneous" or "simultaneously" does not necessarily refer to a UE transmitting the information over multiple legs at the exact same time.

In an embodiment, the method of FIG. 2a may also include, at 220, signaling, to the UE, the power allocation function and the input parameters used to compute an output of the power allocation function. According to some embodiments, the signaling 220 may include transmitting the input parameters of the power allocation function, to the user equipment, via an extended user command indicator (UCI). The input parameters may include uplink instantaneous channel measurement on each subcarrier for each of the legs, modulation scheme used on each subcarrier for each of the legs, overall reliability target, the UE's preference between delay and reliability, and/or uplink power budget.

According to an embodiment, the output of the power allocation function may include a power split percentage among the legs achieving at least one performance objective. For example, in some embodiments, the power allocation function may be represented by a set of polynomial coefficients, a set of tabular entries, or parameters of a neural network, as discussed in detail above. According to certain embodiments, the power allocation function is configured to provide one or more performance objectives, such as: transmission reliability that is above a certain reliability threshold, an average packet delay that is below a certain delay threshold, a trade-off or balance between transmission reliability and average packet delay, and/or a transmission power that attains a target reliability and/or target delay.

According to certain embodiments, the method may also include periodically updating the power allocation function when a better estimate of the power allocation function is obtained, when a change in the radio channel statistics or the network performance metrics has occurred, or when a signal or indication is received from a network entity (e.g., a controller that wants to reset the state). In this case, the method may also include transmitting the updated power allocation function to the user equipment.

Figure 2B:
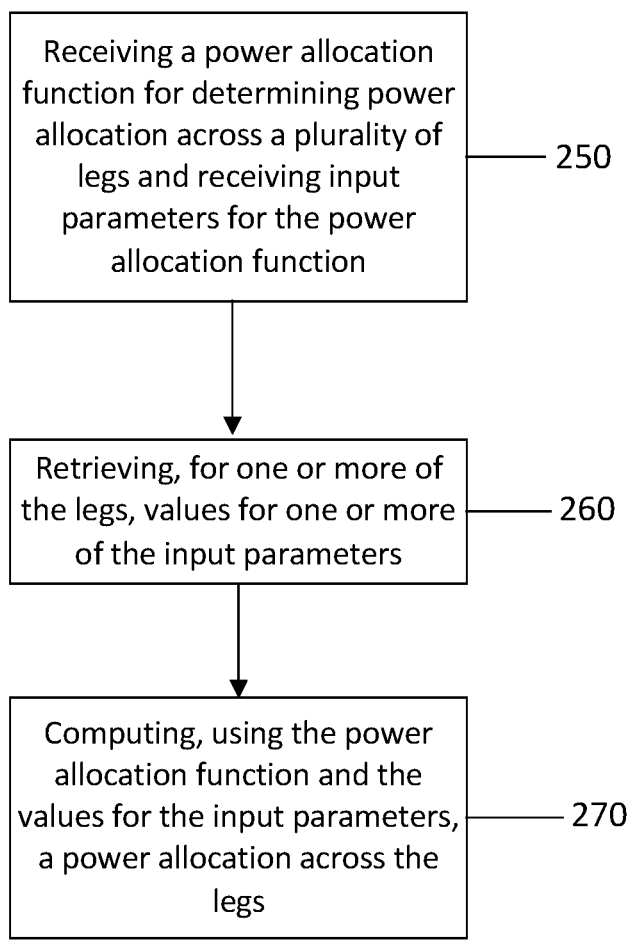
FIG. 2*b* illustrates an example flow diagram of a method, according to an embodiment.

FIG. 2b illustrates an example flow diagram of a method for real-time coordinated UL power control, according to another example embodiment. In certain example embodiments, the flow diagram of FIG. 2b may be performed by a network entity or network node in a communications system, such as LTE or 5G NR. For instance, in some example embodiments, the network entity performing the method of FIG. 2b may include a UE, mobile station, user device, IoT device, or the like. For example, in an embodiment, the method of FIG. 2b may be performed by the UE illustrated in FIG. 1 and may include one or more of the procedures performed by the UE, as discussed in detail above.

In an embodiment, the method of FIG. 2b may include, at 250, receiving a power allocation function for determining power allocation across a plurality of transmission legs and receiving input parameters used to compute an output of the power allocation function. The power allocation function may be based on radio channel statistics and network performance metrics. In some embodiments, as discussed in detail above, the power allocation function may be represented by a set of polynomial coefficients, a set of tabular entries, and/or parameters of a neural network. According to an embodiment, the input parameters of the power allocation function may be received, from a network node, via an extended user command indicator (UCI).

According to one embodiment, the method may also include, at 260, retrieving, for one or more (or all) of the legs, values for one or more of the input parameters. In some embodiments, the input parameters may include, for example, uplink instantaneous channel measurement on each subcarrier for each of the legs, modulation scheme used on each subcarrier for each of the legs, overall reliability target, the UE's preference between delay and reliability, and/or uplink power budget.

In an embodiment, the method may include, at 270, computing, using the power allocation function and the values for the input parameters, a power allocation across the legs. According to certain embodiments, the computing 270 may include computing a tentative power allocation as:

$$P_{b,f,c}^*(i) = \Pi([M_{RB,b,f,c}^{PUSCH}(i)]_{b,f,c}, [MCS_{f,b,c}]_{b,f,c}, [PL_{b,f,c}]_{b,f,c}, [stdPL_{b,f,c}]_{b,f,c}), \text{ and}$$

computing the actual power allocation as $$P_{b,f,c}(i) = \min\left\{ \begin{array}{l} P_{CMAX,f,c}(i) \\ P_{b,f,c}^*(i) + f_{b,f,c}(i) \end{array} \right\},$$

where $P_{CMAX,f,c}(i)$ is the UE configured maximum output power.

According to one embodiment, the actual power allocation may be a power split percentage among the legs achieving at least one performance objective. For example, in some embodiments, the power allocation function may be configured to provide one or more of: a transmission reliability above a certain reliability threshold, an average packet delay that is below a certain delay threshold, a trade-off between transmission reliability and average packet delay, and/or a transmission power that attains at least one of a target reliability or target delay.

Figure 3A:
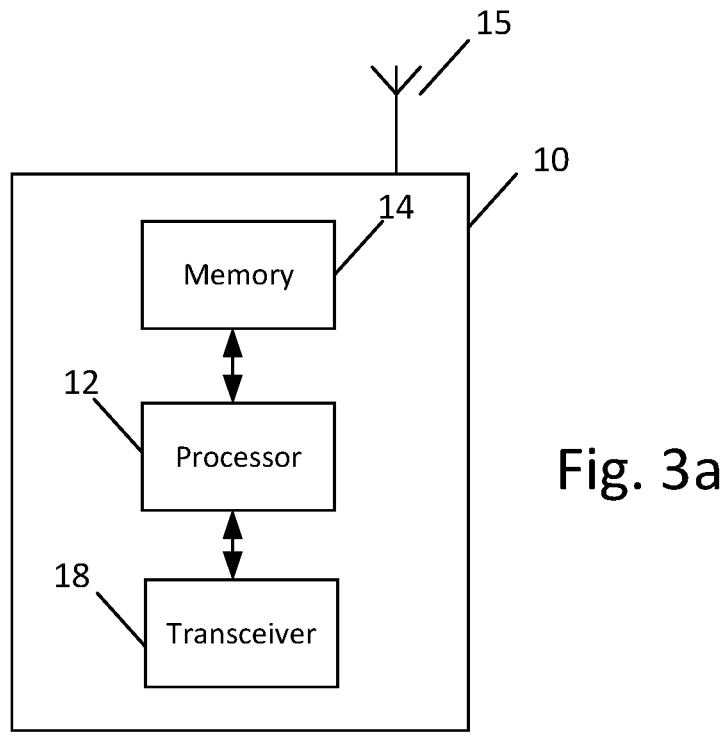
FIG. 3*a* illustrates an example block diagram of an apparatus, according to an embodiment.

FIG. 3a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), high altitude platform station (HAPS), IAB node, and/or WLAN access point, associated with a radio access network, such as a LTE network, 5G or NR. In example embodiments, apparatus 10 may be or may include a master node, master NG-RAN node, master gNB in 5G, master eNB in LTE, or the like.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 3a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, HAPS, IAB node, WLAN access point, or the like. For example, in some embodiments, apparatus 10 may be configured to perform one or more of the processes depicted in any of the flow charts or signaling diagrams described herein, such as those illustrated in FIG. 1, 2a or 2b. In some embodiments, as discussed herein, apparatus 10 may be configured to perform a procedure relating to coordinated UL power control.

According to this embodiment, apparatus 10 may be controlled by memory 14 and processor 12 to collect, for a UE, statistics on UL channel gain probability distribution on one or more of a plurality of transmission legs that are capable of transmitting simultaneously. For example, apparatus 10 may be controlled by memory 14 and processor 12 to collect the statistics from a secondary network node over a Xn interface. In an embodiment, apparatus 10 may be controlled by memory 14 and processor 12 to estimate a power allocation function for determining power allocation across the transmission legs. The power allocation function may be based on radio channel statistics and network performance metrics. According to certain embodiments, to estimate the power allocation function, apparatus 10 may be controlled by memory 14 and processor 12 to compute a parametrized power allocation function configured to receive a set of input parameters tunable or measurable by the UE and to output a desired transmission power on each associated subcarrier for each of the legs.

In an embodiment, apparatus 10 may be controlled by memory 14 and processor 12 to signal, to the UE, the power allocation function and the input parameters used to compute an output of the power allocation function. According to some embodiments, apparatus 10 may be controlled by memory 14 and processor 12 to transmit the input parameters of the power allocation function, to the user equipment, via an extended user command indicator (UCI). The input parameters may include uplink instantaneous channel measurement on each subcarrier for each of the legs, modulation scheme used on each subcarrier for each of the legs, overall reliability target, the UE's preference between delay and reliability, and/or uplink power budget.

According to an embodiment, the output of the power allocation function may include a power split percentage among the legs achieving at least one performance objective. For example, in some embodiments, the power allocation function may be represented by a set of polynomial coefficients, a set of tabular entries, or parameters of a neural network, as discussed in detail above. According to certain embodiments, the power allocation function may be configured to provide one or more performance objectives, such as: transmission reliability that is above a certain reliability threshold, an average packet delay that is below a certain delay threshold, a trade-off or balance between transmission reliability and average packet delay, and/or a transmission power that attains a target reliability and/or target delay.

According to certain embodiments, apparatus 10 may be controlled by memory 14 and processor 12 to periodically update the power allocation function when a better estimate of the power allocation function is obtained or when a change in the radio channel statistics or the network performance metrics has occurred. In this case, apparatus 10 may be controlled by memory 14 and processor 12 to transmit the updated power allocation function to the user equipment.

Figure 3B:
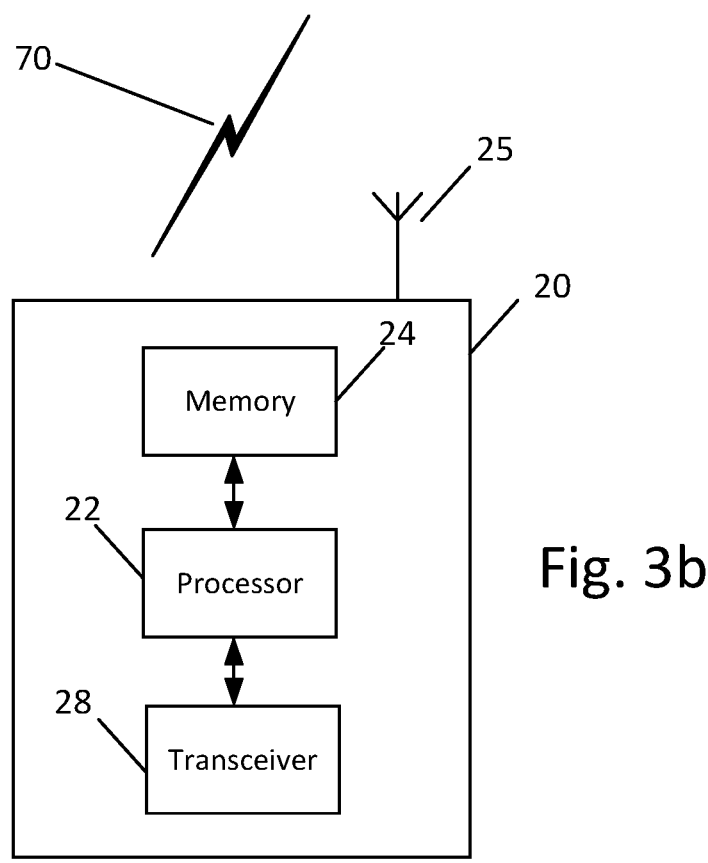
FIG. 3b illustrates an example block diagram of an apparatus, according to an embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3b.

As illustrated in the example of FIG. 3b, apparatus 20 may include or be coupled to a processor 22 (or processing means) for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media, or other storage means. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 (or transceiving means) configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device) or input/output means. In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, 2a or 2b. In certain embodiments, apparatus 20 may be configured to perform a procedure relating to real-time coordinated UL power control, for instance.

For example, in some embodiments, apparatus 20 may be controlled by memory 24 and processor 22 to receive a power allocation function for determining power allocation across a plurality of transmission legs and to receive input parameters used to compute an output of the power allocation function. The power allocation function may be based on radio channel statistics and network performance metrics. In some embodiments, as discussed in detail above, the power allocation function may be represented by a set of polynomial coefficients, a set of tabular entries, and/or parameters of a neural network. According to an embodiment, apparatus 20 may be controlled by memory 24 and processor 22 to receive the input parameters of the power allocation function from a network node, via an extended user command indicator (UCI).

According to one embodiment, apparatus 20 may be controlled by memory 24 and processor 22 to retrieve, for each of the legs, values for one or more of the input parameters. In some embodiments, the input parameters may include, for example, uplink instantaneous channel measurement on each subcarrier for each of the legs, modulation scheme used on each subcarrier for each of the legs, overall reliability target, the UE's preference between delay and reliability, and/or uplink power budget.

In an embodiment, apparatus 20 may be controlled by memory 24 and processor 22 to compute, using the power allocation function and the values for the input parameters, a power allocation across the legs. According to certain embodiments, to compute the power allocation, apparatus 20 may be controlled by memory 24 and processor 22 to compute a tentative power allocation as:

$$P_{b,f,c}^{*}(i) = \Pi([M_{RB,b,f,c}^{PUSCH}(i)]_{b,f,c}, [MCS_{f,b,c}]_{b,f,c}, [PL_{b,f,c}]_{b,f,c}, [stdPL_{b,f,c}]_{b,f,c}), \text{ and}$$

to compute the actual power allocation as $$P_{b,f,c}(i) = \min\left\{ \begin{array}{c} P_{CMAX,f,c}(i) \\ P_{b,f,c}^{*}(i) + f_{b,f,c}(i) \end{array} \right\},$$

where $P_{CMAX,f,c}(i)$ is the UE configured maximum output power.

According to one embodiment, the actual power allocation may include a power split percentage among the legs achieving at least one performance objective. In some embodiments, the power allocation function is configured to provide one or more of: a transmission reliability above a certain reliability threshold, an average packet delay that is below a certain delay threshold, a trade-off between transmission reliability and average packet delay, and/or a transmission power that attains at least one of a target reliability or target delay.

Therefore, certain example embodiments provide several technological improvements, enhancements, and/or advantages over existing technological processes and constitute an improvement at least to the technological field of wireless network control and management. As discussed in detail above, certain embodiments provide a process for real-time coordinated UL power control in dual connectivity. For example, some embodiments allow for joint power allocation across different legs, where the decision on power split across the different legs can be modified and recomputed at high frequency. The ability of the UE to use a pre-computed power allocation function across different legs allows the UE to increase the transmission reliability when using multiple legs with different channel qualities, increase the achieved throughput, decrease the PRB utilization rate, and/or economize the overall UL transmission power. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
    estimating, by a network node, a power allocation function for determining power allocation across a plurality of transmission legs, the power allocation function being based on radio channel statistics and network performance metrics;
    signaling, to a user equipment, the power allocation function and one or more parameters used to compute an output of the power allocation function,
    wherein the estimating further comprises computing a parametrized power allocation function configured to receive a set of input parameters tunable or measurable by the user equipment and to output a desired transmission power on an associated subcarrier for each of the legs,
    wherein the input parameters comprise at least one of: uplink instantaneous channel measurement on each subcarrier for each of the legs, modulation scheme used on each subcarrier for each of the legs, overall reliability target, the user equipment's preference between delay and reliability, or uplink power budget.

2. The method according to claim 1, further comprising:
    collecting, for the user equipment, statistics on uplink channel gain probability distribution on one or more of the legs from another network node.

3. The method according to claim 1, wherein the outputted transmission power comprises a power split percentage among the legs achieving at least one performance objective.

4. The method according to claim 1, further comprising:
    periodically updating the power allocation function when a better estimate of the power allocation function is obtained or when a change in the radio channel statistics or the network performance metrics has occurred or when an indication or signal is received; and
    transmitting the updated power allocation function to the user equipment.

5. The method according to claim 1, wherein the power allocation function is configured to provide at least one of:
    transmission reliability above a certain reliability threshold;
    an average packet delay that is below a certain delay threshold;
    a trade-off between transmission reliability and average packet delay; or
    a transmission power that attains at least one of a target reliability or target delay.

6. A non-transitory computer readable medium comprising program instructions stored thereon for performing at least the method according to claim 1.

7. An apparatus, comprising:
at least one processor; and
at least one memory comprising computer program code, the at least one memory and computer program code configured, with the at least one processor, to cause the apparatus at least to
estimate a power allocation function to determine power allocation across a plurality of transmission legs, the power allocation function being based on radio channel statistics and network performance metrics;
signal, to a user equipment, the power allocation function and one or more parameters used to compute an output of the power allocation function,
wherein, when estimating the power allocation function, the at least one memory and computer program code are further configured, with the at least one processor, to cause the apparatus at least to compute a parametrized power allocation function configured to receive a set of input parameters tunable or measurable by the user equipment and to output a desired transmission power on an associated subcarrier for each of the legs,
wherein the input parameters comprise at least one of: uplink instantaneous channel measurement on each subcarrier for each of the legs, modulation scheme used on each subcarrier for each of the legs, overall reliability target, the user equipment's preference between delay and reliability, or uplink power budget.

8. The apparatus according to claim 7, wherein the at least one memory and computer program code are configured, with the at least one processor, to cause the apparatus at least to:
collect, for the user equipment, statistics on uplink channel gain probability distribution on one or more of the legs from another network node.

9. The apparatus according to claim 7, wherein the outputted transmission power comprises a power split percentage among the legs achieving at least one performance objective.

10. The apparatus according to claim 7, wherein the at least one memory and computer program code configured, with the at least one processor, to cause the apparatus at least to:
periodically update the power allocation function when a better estimate of the power allocation function is obtained or when a change in the radio channel statistics or the network performance metrics has occurred or when an indication or signal is received; and
transmit the updated power allocation function to the user equipment.

11. The apparatus according to claim 7, wherein the power allocation function is configured to provide at least one of:
transmission reliability above a certain reliability threshold;
an average packet delay that is below a certain delay threshold;
a trade-off between transmission reliability and average packet delay; or
a transmission power that attains at least one of a target reliability or target delay.

12. A method, comprising:
receiving, at a user equipment, a power allocation function for determining power allocation across a plurality of transmission legs and receiving input parameters used to compute an output of the power allocation function, the power allocation function being based on radio channel statistics and network performance metrics;
retrieving, for one or more of the legs, values for one or more of the input parameters; and
computing, using the power allocation function and the values for the input parameters, a power allocation across the legs.

13. The method according to claim 12, wherein the computing of the power allocation comprises:
computing a tentative power allocation as:

$P_{b,f,c}^*(i) = \Pi([M_{RB,b,f,c}^{PUSCH}(i)]_{b,f,c}, [MCS_{f,b,c}]_{b,f,c}, [PL_{b,f,c}]_{b,f,c}, [stdPL_{b,f,c}]_{b,f,c})$; and computing the actual power allocation as $$P_{b,f,c}(i) = \min\left\{ \begin{array}{c} P_{CMAX,f,c}(i) \\ P_{b,f,c}^*(i) + f_{b,f,c}(i) \end{array} \right\},$$

where $P_{CMAX,f,c}(i)$ is the UE configured maximum output power.

14. The method according to claim 13, wherein the actual power allocation comprises a power split percentage among the legs achieving at least one performance objective.

15. The method according to claim 12, wherein the input parameters comprise at least one of: uplink instantaneous channel measurement on each subcarrier for each of the legs, modulation scheme used on each subcarrier for each of the legs, overall reliability target, the user equipment's preference between delay and reliability, or uplink power budget.

16. The method according to claim 12, wherein the power allocation function is represented by a set of polynomial coefficients, a set of tabular entries, or parameters of a neural network.

17. The method according to claim 12, wherein the receiving comprises receiving the input parameters of the power allocation function, from a network node, via an extended user command indicator (UCI).

18. The method according to claim 12, wherein the power allocation function is configured to provide at least one of:
transmission reliability above a certain reliability threshold;
an average packet delay that is below a certain delay threshold;
a trade-off between transmission reliability and average packet delay; or
a transmission power that attains at least one of a target reliability or target delay.

19. A non-transitory computer readable medium comprising program instructions stored thereon for performing at least the method according to claim 12.

20. An apparatus, comprising:
at least one processor; and
at least one memory comprising computer program code, the at least one memory and computer program code configured, with the at least one processor, to cause the apparatus at least to
receive a power allocation function for determining power allocation across a plurality of transmission legs and receiving input parameters used to compute an output of the power allocation function, the power allocation function being based on radio channel statistics and network performance metrics;
retrieve, for one or more of the legs, values for one or more of the input parameters; and
compute, using the power allocation function and the values for the input parameters, a power allocation across the legs.

21. The apparatus according to claim 20, wherein, to compute the power allocation, the at least one memory and computer program code are configured, with the at least one processor, to cause the apparatus at least to:

compute a tentative power allocation as:

$$P_{b,f,c}^*(i) = \Pi([M_{RB,b,f,c}^{PUSCH}(i)]_{b,f,c}, [MCS_{f,b,c}]_{b,f,c}, [PL_{b,f,c}]_{b,f,c}, [stdPL_{b,f,c}]_{b,f,c}); \text{ and}$$

compute the actual power allocation as $$P_{b,f,c}(i) = \min\left\{ \begin{array}{c} P_{CMAX,f,c}(i) \\ P_{b,f,c}^*(i) + f_{b,f,c}(i) \end{array} \right\},$$

where $P_{CMAX,f,c}(i)$ is the UE configured maximum output power.

22. The apparatus according to claim 21, wherein the actual power allocation comprises a power split percentage among the legs achieving at least one performance objective.

23. The apparatus according to claim 20, wherein the input parameters comprise at least one of: uplink instantaneous channel measurement on each subcarrier for each of the legs, modulation scheme used on each subcarrier for each of the legs, overall reliability target, the user equipment's preference between delay and reliability, or uplink power budget.

24. The apparatus according to claim 20, wherein the power allocation function is represented by a set of polynomial coefficients, a set of tabular entries, or parameters of a neural network.

25. The apparatus according to claim 20, wherein the at least one memory and computer program code are configured, with the at least one processor, to cause the apparatus at least to receive the input parameters of the power allocation function, from a network node, via an extended user command indicator (UCI).

26. The apparatus according to claim 20, wherein the power allocation function is configured to provide at least one of:

transmission reliability above a certain reliability threshold;

an average packet delay that is below a certain delay threshold;

a trade-off between transmission reliability and average packet delay; or a transmission power that attains at least one of a target reliability or target delay.

* * * * *